US011367056B2

(12) United States Patent
Friedlander

(10) Patent No.: US 11,367,056 B2
(45) Date of Patent: Jun. 21, 2022

(54) KIOSK-BASED SYSTEMS AND METHODS FOR SELLING CRYPTOCURRENCIES

(71) Applicant: Coinstar Asset Holdings, LLC, Bellevue, WA (US)

(72) Inventor: Jason Friedlander, Lone Tree, CO (US)

(73) Assignee: Coinstar Asset Holdings, LLC, Bellevue, WA (US)

(*) Notice: Subject to any disclaimer, the term of this patent is extended or adjusted under 35 U.S.C. 154(b) by 0 days.

(21) Appl. No.: 16/854,761

(22) Filed: Apr. 21, 2020

(65) Prior Publication Data

US 2020/0342424 A1    Oct. 29, 2020

Related U.S. Application Data

(60) Provisional application No. 62/838,638, filed on Apr. 25, 2019.

(51) Int. Cl.
| | |
|---|---|
| *G06Q 20/06* | (2012.01) |
| *G06Q 20/18* | (2012.01) |
| *G06Q 20/40* | (2012.01) |
| *G06Q 20/38* | (2012.01) |

(52) U.S. Cl.
CPC .......... *G06Q 20/065* (2013.01); *G06Q 20/18* (2013.01); *G06Q 20/381* (2013.01); *G06Q 20/38215* (2013.01); *G06Q 20/4012* (2013.01)

(58) Field of Classification Search
CPC .... G06Q 20/065; G06Q 20/18; G06Q 20/381; G06Q 20/38215; G06Q 20/4012
USPC .......................................................... 705/39
See application file for complete search history.

(56) References Cited

U.S. PATENT DOCUMENTS

| | | | |
|---|---|---|---|
| 5,564,546 | A | 10/1996 | Molbak et al. |
| 5,620,079 | A | 4/1997 | Molbak |
| 5,842,916 | A | 12/1998 | Gerrity et al. |
| 6,056,104 | A | 5/2000 | Neubarth et al. |

(Continued)

OTHER PUBLICATIONS

Bitcoin ATM: a criminal's laundromat for cleaning money Publication info: St. Thomas Law Review 27.2: 287. St. Thomas Law Review. (Jun. 2015) (Year: 2015).*

(Continued)

*Primary Examiner* — Sara C Hamilton
(74) *Attorney, Agent, or Firm* — Perkins Coie LLP

(57) ABSTRACT

A method for selling a cryptocurrency via a consumer-operated kiosk is provided. In some embodiments, the method: displays to a user, via a user interface, one or more options to purchase one or more cryptocurrencies; receives from the user, via the user interface, a selection of one of the cryptocurrencies; obtains a cryptocurrency exchange rate from a cryptocurrency exchange; presents the exchange rate to the user via the user interface; receives from the user payment for the selected cryptocurrency via a bill acceptor; purchases the selected cryptocurrency from the cryptocurrency exchange in an amount based on a value of the received payment and the exchange rate; and displays to the user, via the user interface, a receipt having a redemption code and a personal identification number (PIN), wherein both the redemption code and the PIN are necessary to obtain the selected cryptocurrency.

22 Claims, 6 Drawing Sheets

(56) References Cited

U.S. PATENT DOCUMENTS

| | | |
|---|---|---|
| 6,116,402 A | 9/2000 | Beach et al. |
| 6,349,972 B1 | 2/2002 | Geiger et al. |
| 7,014,108 B2 | 3/2006 | Sorenson et al. |
| 7,653,599 B2 | 1/2010 | Doran et al. |
| 7,865,432 B2 | 1/2011 | Doran et al. |
| 8,033,375 B2 | 10/2011 | Doran et al. |
| 8,874,467 B2 | 10/2014 | Yahn et al. |
| 8,967,361 B2 | 3/2015 | Martin |
| 9,022,841 B2 | 5/2015 | Martin |
| 9,064,268 B2 | 6/2015 | Larrick et al. |
| 9,129,294 B2 | 9/2015 | Yahn |
| 9,135,787 B1 | 9/2015 | Russell et al. |
| 10,269,009 B1 * | 4/2019 | Winklevoss .......... G06Q 20/105 |
| 10,915,891 B1 * | 2/2021 | Winklevoss ....... G06Q 20/3678 |
| 2006/0207856 A1 | 9/2006 | Dean et al. |
| 2013/0117137 A1 | 5/2013 | Klein et al. |
| 2013/0161153 A1 | 6/2013 | Saez et al. |
| 2014/0013635 A1 | 1/2014 | Cui |
| 2015/0278801 A1 | 10/2015 | Friedlander |
| 2015/0363769 A1 | 12/2015 | Ronca et al. |
| 2016/0232609 A1 | 8/2016 | Lindemulder et al. |
| 2016/0234026 A1 | 8/2016 | Wilkins et al. |
| 2016/0292710 A1 | 10/2016 | Cassells et al. |
| 2017/0053249 A1 | 2/2017 | Tunnell et al. |
| 2017/0323282 A1 | 11/2017 | Doran et al. |
| 2019/0087698 A1 * | 3/2019 | Di Iorio .................. G07F 17/42 |
| 2019/0139033 A1 * | 5/2019 | Ricotta .............. G06Q 20/3678 |
| 2020/0074419 A1 * | 3/2020 | Govender ............ G06Q 20/381 |
| 2020/0111071 A1 * | 4/2020 | Morena ................ G06Q 20/381 |
| 2020/0258152 A1 * | 8/2020 | Naggar .................. G06Q 40/04 |
| 2020/0265391 A1 * | 8/2020 | Iwata ................ G06Q 20/3678 |
| 2020/0273002 A1 * | 8/2020 | Regen ................ G06Q 20/3265 |
| 2021/0004775 A1 * | 1/2021 | Kim ..................... G06Q 20/065 |

OTHER PUBLICATIONS

Casey et al., "BiBeat: Robocoin ATMs Becoming a "Bank", WSJ Blog", Dow Jones Institutional News, May 1, 2014, 3 pages.

Shin, "Here's the Man Who Created ICOs and This is the New Token he's Backing", Forbes, Sep. 21, 2017, 4 pages.

Cuen, "Coinme Token Sale Spreads User-Friendly Bitcoin ATMs", International Busines Times News, Newstex LLC, Sep. 22, 2017, 2 pages.

"Coinme Token Sale Spreads User-Friendly Bitcoin ATMs", International Busines Times News—US ed., Gale Group, Inc., Sep. 23, 2017, 3 pages.

Tehee, "This company lets you buy bitcoin from an ATM. Fresno now has two", Fresno Bee (California), May 11, 2018, 2 pages.

"Coinme Continues Crypto ATM Expansion in California: Cryptocurrency financial services leader adds eight new crypto ATM locations to offer easy, instant access to cryptocurrency across the state", iCrowdNewswire LLC, Jul. 12, 2018, 2 pages.

"Coinme Launches UpToken to Create Global Crypto ATM Network", iCrowdNewswire LLC, Jul. 18, 2018, 2 pages.

Coinme Now Offers the Ability to Buy Bitcoin at Coinstar Kiosks, Jan. 17, 2019, 2 pages, (https://www.coinstar.com/press-releases/coinme-now-offers-the-ability-to-buy-bitcoin-at-coinstar-kiosks).

Harper, "Living on Bitcoin Day 6: An Artist, a Devand a Moon Boy Walk Into a Bar", Bitcoin Magazine, Jan. 23, 2019, 4 pages.

PCT International Search Report and Written Opinion for PCT Application No. PCT/US2020/029158, dated Jul. 16, 2020, 21 pages.

Kyovsky, Karel (herein, Kyovsky 2), BATMOne and BATMTwo—Bitcoin ATM—Bitcoins purchase process, (1 page), Jun. 16, 2014, available via Youtube.com at: https://www.youtube.com/watch?v=RN8bHtN1Cpk.†

Kyovsky, Karel (herein, Kyovsky 1), BATMOne and BATMTwo—Bitcoin ATM—Buying bitcoins to your email, (1 page), Jun. 16, 2014, available via Youtube.com at: https://www.youtube.com/watch?v=FauhmxgCzwl.†

Coin ATM Radar (herein, Coin ATM Radar 2), Bitcoin ATM settings for hot wallets and exchange integrations, (8 pages), Sep. 21, 2016, available at: https://coinatmradar.com/blog/bitcoin-atm-settings-of-hot-wallets-and-exchange-integrations/ and via Archive.org (at least Feb. 9, 2017) at: https://web.archive.org/web/20170209160731/https://coinatmradar.com/blog/bitcoin-atm-settings-of-hot-wallets-and-exchange-integrations/.†

Coin ATM Radar (herein, Coin ATM Radar 1), How to buy bitcoins with Bitcoin ATM, (40 pages), Oct. 31, 2014, available at: https://coinatmradar.com/blog/how-to-buy-bitcoins-with-bitcoin-atm/ and via Archive.org (at least Oct. 10, 2018) at: https://web.archive.org/web/20181010014847/http://coinatmradar.com/blog/how-to-buy-bitcoins-with-bitcoin-atm/.†

\* cited by examiner
† cited by third party

KIOSK-BASED SYSTEMS AND METHODS FOR SELLING CRYPTOCURRENCIES

CROSS-REFERENCE TO RELATED APPLICATION(S)

The present application claims priority to U.S. Provisional Patent Application No. 62/838,638, titled KIOSK-BASED SYSTEMS AND METHODS FOR SELLING CRYPTO-CURRENCIES, filed Apr. 25, 2019, the disclosure of which is incorporated herein by reference in its entirety.

TECHNICAL FIELD

The present disclosure relates generally to systems and methods for selling cryptocurrencies and, more particularly, to systems and methods for selling cryptocurrencies via consumer-operated kiosks.

BACKGROUND

Cryptocurrencies have gained widespread popularity in recent years. For example, bitcoin, which is the most popular cryptocurrency, is now accepted in a wide variety of establishments, and it is likely that the number of retailers and businesses that accept bitcoin will continue to rise. Cryptocurrencies provide not only a convenient, prompt, and secure method of payment for goods and services, but also the potential for appreciation.

In order to buy or sell a cryptocurrency, a user typically needs a cryptocurrency wallet (e.g., a bitcoin wallet). A cryptocurrency wallet is software that stores and manages public and private keys of the user that can be used to receive or spend a cryptocurrency. Once the user has a cryptocurrency wallet, the user can use a traditional medium, such as a credit card, bank transfer, or debit card, to buy or sell a cryptocurrency on a cryptocurrency exchange or "crypto exchange." However, many "un-banked" consumers do not have a credit card or bank account, leaving an entire segment of the population unable to gain access to cryptocurrencies. Moreover, some banks and credit card companies do not allow their cardholders to purchase a cryptocurrency with their credit cards. Accordingly, it would be advantageous to provide consumers with a convenient and easy way to buy a cryptocurrency and participate in this dynamic new economy.

DETAILED DESCRIPTION

Figure 1:
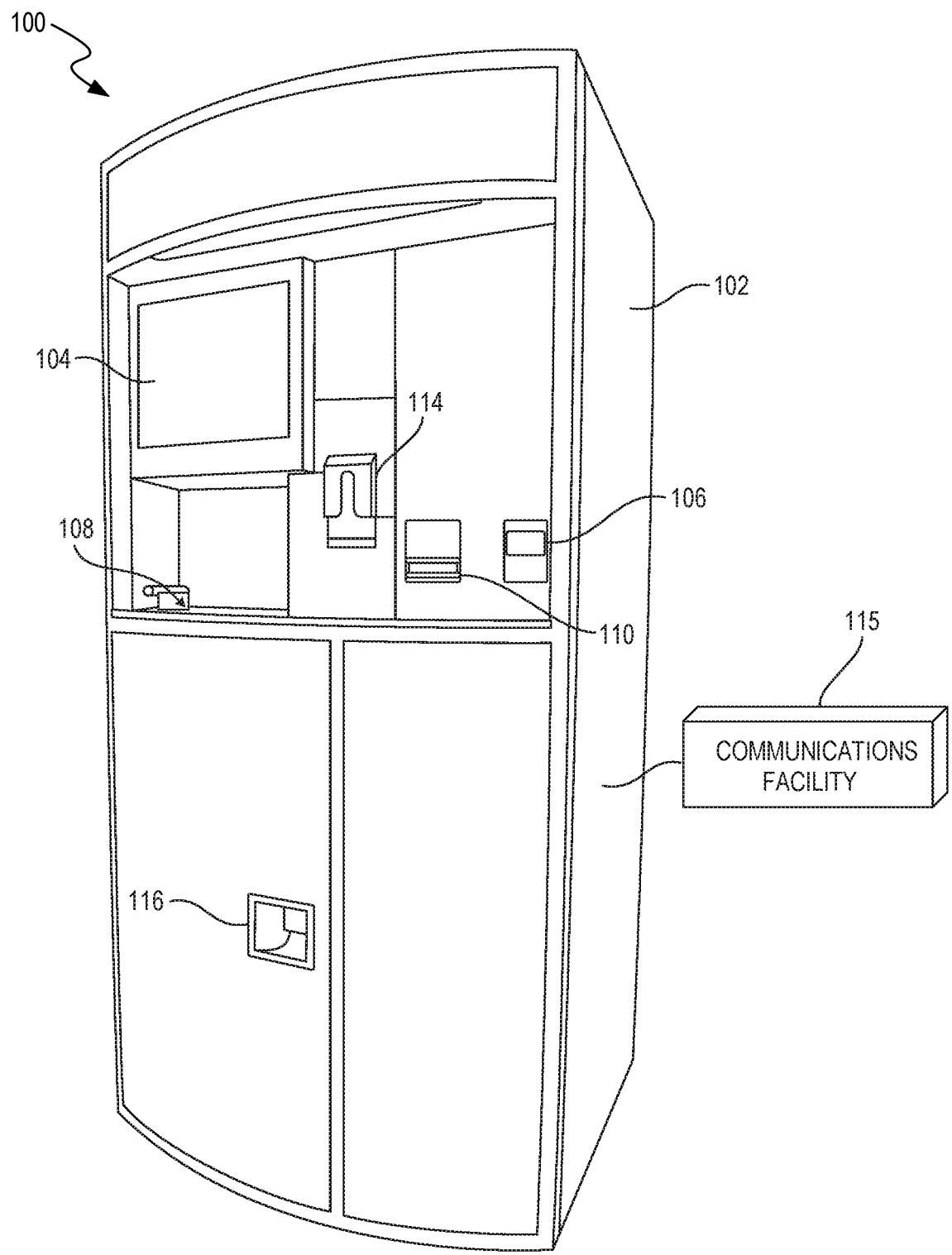
FIG. 1 is a partially schematic isometric view of a consumer-operated kiosk configured in accordance with some embodiments of the present technology.

The following disclosure describes various embodiments of kiosk-based systems and methods for selling cryptocurrencies (e.g., bitcoin) to consumers. In some embodiments, the consumer-operated kiosks described herein allow a user to purchase a cryptocurrency with cash. For example, in some embodiments a user can go to one of the consumer-operated kiosks and select a cryptocurrency that the user desires to purchase via the user interface of the kiosk. In response to receiving the user selection, the kiosk displays the current exchange rate for the selected cryptocurrency. The kiosk obtains the current exchange rate from a cryptocurrency exchange. A cryptocurrency exchange is an online platform (e.g., Coinbase) that allows users to trade cryptocurrencies for other assets, such as conventional fiat currencies or other cryptocurrencies. The kiosk communicates with the cryptocurrency exchange through a crypto server, which provides Application Programming Interfaces (APIs) that enable the kiosk to perform many of the functions described herein, including obtaining an exchange rate from the cryptocurrency exchange. In addition to displaying the current exchange rate, the kiosk also displays the transaction terms to the user. Once the user accepts the transaction terms (e.g., by touching an "Accept" button displayed on the user interface), the kiosk is ready to accept payment. The user can use a variety of payment methods (e.g., paper bills, coins, credit cards, debit cards, gift cards, mobile payments, etc.). For example, in some embodiments, the user can insert paper bills (e.g., cash bills) into the kiosk bill acceptor and/or pour coins into the kiosk coin acceptor. As the payment is received and processed, the kiosk displays the amount of the cryptocurrency corresponding to the received payment based on the current exchange rate. After the payment is processed, the user confirms the purchase via the user interface of the kiosk (e.g., by touching a "Send Cryptocurrency" button). Upon receiving the purchase confirmation, the kiosk proceeds with purchasing the cryptocurrency from the cryptocurrency exchange by invoking an API of the crypto server. Then the kiosk can provide the user with, e.g., a voucher that includes a redemption code and personal identification number (PIN), which are unique to each transaction and used to verify the transaction when the user subsequently redeems the cryptocurrency.

In some embodiments, the user can redeem or claim the cryptocurrency using the redemption code and PIN by visiting a website of a cryptocurrency exchange (e.g., www-.coinme.com). The user can use a personal electronic device (e.g., a personal computer, smartphone, etc.) to redeem the cryptocurrency at the website of the cryptocurrency exchange. The user can sign in to the website using an existing account or create a new account. After the user's login credentials (e.g., a username and password) are verified, the user enters the redemption code and PIN. The cryptocurrency exchange evaluates the redemption code to verify the transaction associated with the redemption code. Then the cryptocurrency exchange sends the PIN to the crypto server via an API call to the crypto server so that it can verify the PIN and ensure the validity of the transaction. If both the verification of the redemption code by the cryptocurrency exchange and the verification of the PIN by the crypto server are successful, the cryptocurrency is added to a cryptocurrency wallet of the user. This two-factor authentication of the transaction reduces the risk of a fraudulent transaction and hacking by providing an extra layer of security and protection. In embodiments in which the crypto server and the cryptocurrency exchange are operated by different entities, this two-factor authentication also permits each entity to independently verify the authenticity of the transaction before adding the cryptocurrency to the wallet of the user, as described in greater detail below.

In some embodiments, the consumer-operated kiosks described herein allow a user to obtain cash in return for cryptocurrency. For example, in some embodiments, a user can go to one of the consumer-operated kiosks and select an option to sell cryptocurrency (or withdraw cash) via the user interface of the kiosk. The user then inputs information to identify the user's cryptocurrency wallet (e.g., by scanning a QR code associated with the cryptocurrency wallet). Alternatively, the user can scan or input an ID and the kiosk can automatically retrieve information about the cryptocurrency wallet associated with the ID. After providing the cryptocurrency wallet information, the user enters the amount of the cryptocurrency that the user wants to exchange for cash, and the kiosk displays the amount of cash corresponding to the amount of the cryptocurrency entered by the user based on the current exchange rate, which is obtained from a cryptocurrency exchange via an API call to the crypto server. Once the user confirms the exchange transaction via the user interface of the kiosk (e.g., by touching a "Get Cash" button), the kiosk processes the transaction by communicating with the cryptocurrency exchange via the APIs of the crypto server and dispenses the cash to the user via a cash outlet of the kiosk.

In some embodiments, instead of receiving the cryptocurrency wallet information from the user, the kiosk can display, via the user interface, a cryptocurrency address (e.g., in the form a QR code) to which the user can send the cryptocurrency. The user can use a personal electronic device (e.g., a smartphone) to send the cryptocurrency to that address. The kiosk then waits for confirmation of the exchange transaction, and after receiving the confirmation, dispenses the cash to the user via the cash outlet.

FIG. 1 is a partially schematic isometric view of a consumer-operated kiosk 100 ("kiosk 100") for selling a cryptocurrency (e.g., bitcoin) in accordance with some embodiments of the present technology. In some embodiments, the kiosk 100 can be a consumer-operated coin counting kiosk that is located in retail outlets (e.g., grocery stores, drug stores, etc.) banks, and/or other publicly-accessible areas. In some embodiments, the kiosk 100 is approximately the same size as a conventional food or soft drink vending machine.

The kiosk 100 includes a housing 102, a user interface 104, and devices for receiving payment from users, such as a bill acceptor 106, a coin acceptor 108, and a card reader 110 (collectively referred to as a "funds input region"). The user interface 104 can include a display screen or monitor for operationally interfacing with users via visual or audible signals, textual instructions, animations, dialogue boxes, touch screens, selector buttons, icons, prompts, or other features provided to users. In some embodiments, the user interface 104 includes a touch screen that can provide visual or audio information to, and receive information from, users. In some embodiments, the user interface 104 can include other input devices that can provide and receive user information, such as a keypad, an encrypted PIN pad, a voice command device, and other suitable user input devices known in the art. In some embodiments, the coin acceptor 108 includes a hinged tray in which the user may pour their coins and then lift one side of the tray to cause the coins to flow into the kiosk 100. In some embodiments, other types of coin input devices and systems can be included with the kiosk 100. The kiosk 100 can house a coin discriminator for discriminating and counting the coins input by the user to determine an associated value (e.g., a total value). The kiosk 100 additionally houses a voucher/coupon printer for printing vouchers, coupons, receipts and other printed indicia associated with coin counting transactions that are dispensed to the user via a dispensing slot 114. The kiosk 100 also includes a coin return slot 116 that returns unaccepted coins to the user. In some embodiments, the user can supplement the coin value by providing additional funds to the kiosk. For example, the user can provide cash funds via the bill acceptor 106 and credit or debit value via the card reader 110 that can read a magnetic stripe, optical indicia, and the like on a corresponding credit or debit card input by the user.

In addition to the foregoing features, the kiosk 100 can further include a communication facility 115 for communicating with various remote computing systems, including servers, databases, financial institutions, third party merchants, other consumer operated kiosks within the same network, and other remote computing systems to perform various notification and transaction functions. The communication facility 115 can include a wired connection (e.g., an Ethernet port, cable modem, FireWire cable, Lightning connector, USB port, etc.) or a wireless connection (e.g., Wi-Fi, Bluetooth, near-field communication (NFC), cellular radio utilizing 4G LTE technologies, etc.) suitable for communication with remote computing systems via a communication link 204 or directly via a peer-to-peer network. The kiosk 100 and its various components and systems can be at least generally similar in structure and function to the kiosks and corresponding kiosk components and systems described in the following U.S. patents and patent applications, each of which is incorporated herein by reference in its entirety: U.S. patent application Ser. Nos. 13/671,299, 13/728,905, 13/790,674, 14/312,393, 14/617,672, and 14/674,860; and U.S. Pat. Nos. 5,564,546, 5,620,079, 6,056,104, 5,842,916, 6,116,402, 6,349,972, 8,033,375, 7,653,599, 7,865,432, 7,014,108, 9,064,268, 8,874,467, 8,967,361 9,022,841, and 9,129,294.

Figure 2:
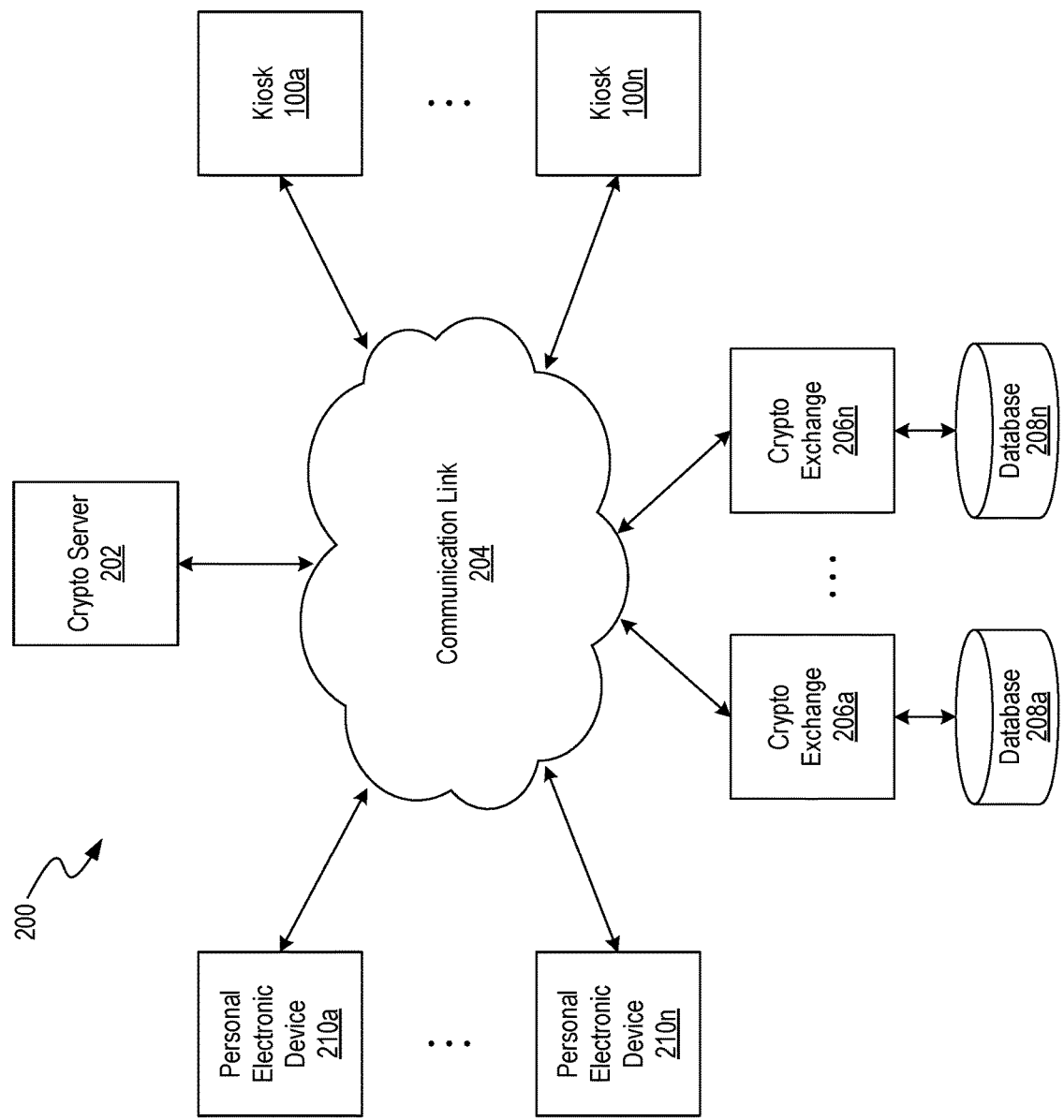
FIG. 2 is a schematic diagram illustrating components of an environment for selling a cryptocurrency via consumer-operated kiosks in accordance with some embodiments of the present technology.

FIG. 2 is a schematic diagram of a suitable computing environment 200 in which various embodiments of the present technology can be implemented. The environment 200 includes multiple of the consumer-operated kiosks 100 (identified individually as kiosks 100a-100n) that can be operably connected to one or more remote computing systems (e.g., a crypto server 202) via a communication link 204. The communication link 204 can include one or more wired or wireless networks such as, but not limited to, an intranet, the Internet, a Local Area Network (LAN), a Wireless Local Area Network (WLAN), a Personal Area Network (PAN), a Campus Area Network (CAN), a Metropolitan Area Network (MAN), a Wide Area Network (WAN), a Wireless Wide Area Network (WWAN), Global System for Mobile Communications (GSM), Bluetooth, Wi-Fi, and LTE networks, and can use one or more messaging protocols, such as TCP/IP, SMS, MMS, extensible messaging and presence protocol (XMPP), real time messaging protocol (RTMP), instant messaging and presence protocol (IMPP), instant messaging, USSD, IRC, and any other wireless or wired data network or messaging protocols. Although the communication link 204 can include a publicly available network (e.g., the Internet), the kiosks 100 can also connect to and communicate with remote computing systems through a private communication link (e.g., an intranet).

The crypto server 202 is operably connected to the kiosks 100 and one or more cryptocurrency exchanges 206 (identified individually as cryptocurrency exchanges 206a-206n) via the communication link 204 and provides APIs that enable the kiosks 100 to perform many of the functions associated with the routines described herein. For example, the crypto server 202 provides APIs for the kiosks 100 to invoke and obtain the current price of a cryptocurrency from a cryptocurrency exchange 206 and to purchase the cryptocurrency at that price from the cryptocurrency exchange 206. A cryptocurrency exchange is a third-party online platform (e.g., Coinbase) that allows users to trade cryptocurrencies for other assets, such as conventional fiat currencies or other cryptocurrencies. A cryptocurrency exchange 206 includes a database 208 that can store web pages of the cryptocurrency exchange 206 and other content exchanged between personal electronic devices 210 (identified individually as personal electronic devices 210a-210n) of a user and the cryptocurrency exchange 206, user account information, cryptocurrency transaction information, etc. In some embodiments, the crypto server 202 and the cryptocurrency exchange 206 can be operated by, or associated with, different entities. For example, in some embodiments the crypto server 202 can be operated by, or associated with, an entity that operates the kiosks, while the cryptocurrency exchange 206 can be operated by, or associated with, a different entity that operates the cryptocurrency exchange.

In some embodiments, the crypto server 202 facilitates an authentication (e.g., a two-factor authentication) of a cryptocurrency transaction. For example, in some embodiments, when a user purchases a cryptocurrency at one of the kiosks 100, the user receives two redemptive tokens: a first unique code (e.g., a redemption code) and a second unique code (e.g., a PIN). In some embodiments, for example, the kiosk 100 may print a receipt having the redemption code and the PIN. In other embodiments, the user receives the redemption code and the PIN in other suitable ways (e.g., via text message, email, the kiosk display, etc.). Both the redemption code and the PIN are associated with the transaction in one or more suitable databases, and both the redemption code and the PIN may be necessary for the user to obtain the purchased cryptocurrency from the cryptocurrency exchange 206. In some embodiments, both the redemption code and the PIN are computer generated (e.g., generated by one or more computing systems associated with the kiosks 100, the crypto server 202, and/or the cryptocurrency exchange 206). In other embodiments, at least one of the redemption code or the PIN can be selected/generated by the user. In such embodiments, the kiosk 100 may prompt the user to input the desired user selected redemption code and/or PIN via the user interface 104. The kiosk 100 can then send the user selected redemption code and/or PIN to the crypto server 202 and/or the cryptocurrency exchange 206 to associate the user selected redemption code and/or PIN with the transaction. In some embodiments, the redemption code is stored at a computer associated with the cryptocurrency exchange 206, and the PIN is stored at the crypto server 202 (or a computer associated with the crypto server 202) at least until the redemption process is complete (e.g., at least until the user obtains the purchased cryptocurrency from the cryptocurrency exchange 206 as described below).

During the redemption process, the user uses a personal electronic device 210 (e.g., a personal computer, tablet, smartphone, etc.) to connect to a website of the cryptocurrency exchange 206 and enter the redemption code and the PIN. The cryptocurrency exchange 206 uses the redemption code to verify the transaction. For example, in some embodiments the cryptocurrency exchange 206 can compare the received redemption code with the stored redemption codes. In some embodiments, the cryptocurrency exchange 206 may also compare other information about the requested transaction at the cryptocurrency exchange 206 (e.g., a user telephone number, the amount of the purchased cryptocurrency, etc.) with information associated with the stored redemption codes. If the received redemption code matches a stored redemption code (and/or if the other information matches the information associated with the stored redemption code), the transaction is verified with the cryptocurrency exchange 206. The cryptocurrency exchange also invokes an API of the crypto server 202 to verify the PIN with the crypto server 202. For example, the cryptocurrency exchange 206 can send the PIN to the crypto server 202, and the crypto server 202 can compare the received PIN with the stored PINs. In some embodiments, the crypto server 202 may also compare other information about the requested transaction at the cryptocurrency exchange 206 (e.g., a user telephone number, the amount of funds received from the user, etc.) with information associated with the stored PINs. If the received PIN matches one of the stored PINs (and/or if the other information matches the information associated with the stored PIN), the transaction is verified with the crypto server 202. In the foregoing example, a first entity (e.g., a cryptocurrency exchange operator) that operates the cryptocurrency exchange 206 can use the redemption code to verify the transaction, and a second entity (e.g., a kiosk operator) that operates the crypto server 202 and/or the kiosks 100 can use the PIN to independently verify the transaction before the user is able to obtain the purchased cryptocurrency.

In some embodiments, two or more entities involved in the cryptocurrency transaction can each verify certain aspects of the transaction before they permit the cryptocurrency exchange 206 to add the purchased cryptocurrency to the user's cryptocurrency wallet. For example, a first entity (e.g., the cryptocurrency exchange operator) may use the redemption code to identify the specific transaction that the user is attempting to redeem, to identify the specific cryptocurrency that was purchased with the user's funds, to confirm that it previously purchased the cryptocurrency associated with the specific transaction, and/or to confirm some other aspect of the transaction. A second entity (e.g., the kiosk operator) may use the PIN to confirm that the kiosk 100 received the funds associated with the specific transaction and/or some other aspect of the transaction. Any of these aspects may be verified as outlined above (e.g., by comparing the received code with the stored codes and/or by comparing information associated with stored codes to information about a requested transaction at the cryptocurrency exchange 206). Both the first entity and the second entity are therefore able to confirm various aspects of the specific transaction before allowing the cryptocurrency exchange 206 to disperse the purchased cryptocurrency to the user's cryptocurrency wallet. In some embodiments, if the first entity or the second entity is unable to confirm one or more aspects of the transaction (e.g., if confirmation of either the redemption code or the PIN fails), the cryptocurrency exchange 206 may deny the transaction or otherwise delay adding cryptocurrency to the user's wallet. This process may reduce the likelihood of fraudulent activity that could be costly to the cryptocurrency exchange, the kiosk operator, or both.

The computing systems on which the kiosks 100, the crypto server 202, the cryptocurrency exchanges 206, the personal electronic devices 210, and the other systems of FIG. 2 may be implemented may include a central processing unit, input devices, output devices (e.g., display devices and speakers), storage devices (e.g., memory and disk drives), network interfaces, graphics processing units, cellular radio link interfaces, global positioning system devices, and so on. The input devices may include keyboards, pointing devices, touch screens, gesture recognition devices (e.g., for air gestures), head and eye tracking devices, microphones for voice recognition, and so on. The computing systems may include high-performance computing systems, cloud-based servers, desktop computers, laptops, tablets, e-readers, personal digital assistants, smartphones, gaming devices, servers, and so on. The computing systems may access computer-readable media that include computer-readable storage media and data transmission media. The computer-readable storage media are tangible storage means that do not include a transitory, propagating signal. Examples of computer-readable storage media include memory such as primary memory, cache memory, and secondary memory (e.g., DVD) and other storage. The computer-readable storage media may have recorded on them or may be encoded with computer-executable instructions or logic that implements the kiosks 100, the crypto server 202, the cryptocurrency exchanges 206, the personal electronic devices 210, and the other systems of FIG. 2. The data transmission media are used for transmitting data via transitory, propagating signals or carrier waves (e.g., electromagnetism) via a wired or wireless connection. The computing systems may include a secure cryptoprocessor as part of a central processing unit for generating and securely storing keys and for encrypting and decrypting data using the keys.

The functions performed by the kiosks 100, the crypto server 202, the cryptocurrency exchanges 206, the personal electronic devices 210, and the other systems of FIG. 2 may be described in the general context of computer-executable instructions, such as program modules and components, executed by one or more computers, processors, or other devices. Generally, program modules or components include routines, programs, objects, data structures, and so on that perform tasks or implement data types of the kiosks 100, the crypto server 202, the cryptocurrency exchanges 206, the personal electronic devices 210, and the other systems of FIG. 2. Typically, the functionality of the program modules may be combined or distributed as desired in various examples. Aspects of the kiosks 100, the crypto server 202, the cryptocurrency exchanges 206, the personal electronic devices 210, and the other systems of FIG. 2 may be implemented in hardware using, for example, an application-specific integrated circuit ("ASIC") or field programmable gate array ("FPGA").

The various components and component arrangements depicted in FIG. 2 are merely illustrative of some embodiments of the present technology. Aspects of the invention may be practiced in a variety of other computing environments. Some embodiments can include additional components. For example, those of ordinary skill in the art will understand that embodiments of the environment 200 can further include or be connectable to other entities, such as financial institutions for reconciling purchases (e.g., banks, credit/debit card providers, accounting clearing houses) and other associated computer systems, as necessary to implement electronic commerce and other aspects of the methods and systems described herein. In some embodiments, the environment 200 may lack one or more of the components shown in FIG. 2. In some embodiments, the functions of the crypto server 202 may be divided among multiple other servers or resources. For example, in some embodiments, all or a portion of the functions performed by the crypto server 202 can be performed by the kiosks 100 themselves. Although the kiosks 100 and the cryptocurrency exchanges 206 are described as being operated by separate entities, in some embodiments, these entities may be a single entity. For example, all or a portion of the functions performed by the cryptocurrency exchanges 206 can be performed or controlled by the kiosk operator (e.g., Coinstar).

Figure 3:
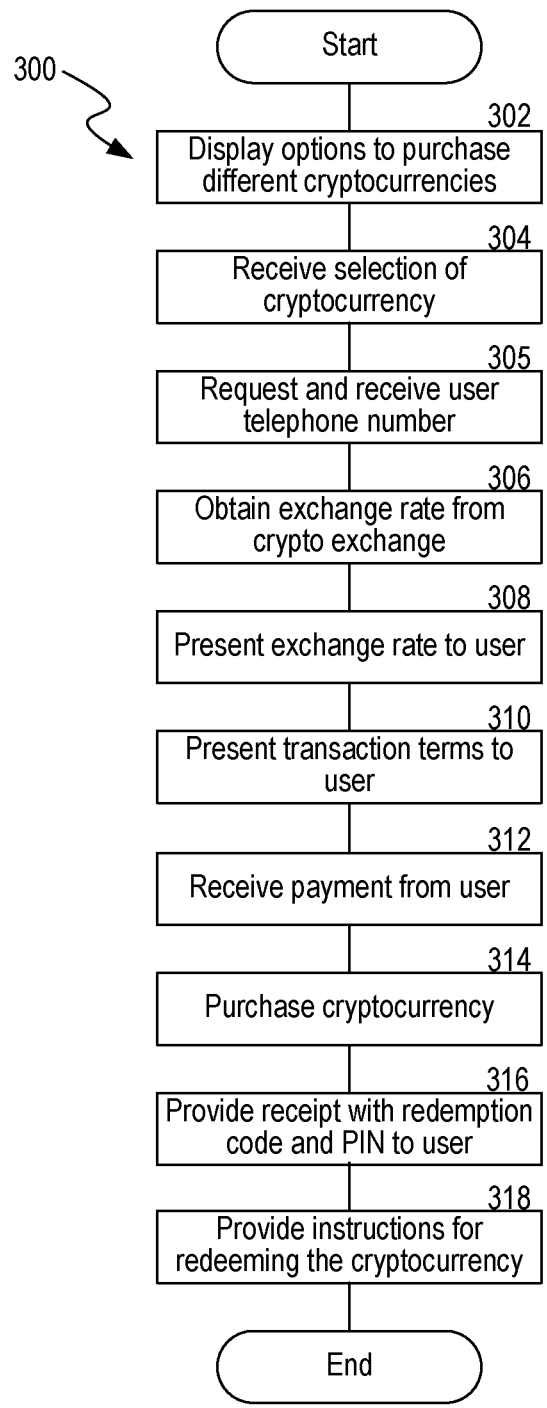
FIG. 3 is a flow diagram of a routine for selling a cryptocurrency via a consumer-operated kiosk in accordance with some embodiments of the present technology.

FIG. 3 is a flow diagram of a routine 300 for selling a cryptocurrency via a consumer-operated kiosk (e.g., the kiosk 100) in accordance with some embodiments of the present technology. The routine can be executed by a processing device in accordance with computer-executable instructions stored on a computer-readable medium. For example, the routine can be executed by application software running on the kiosk 100 and/or other processing devices. Those skilled in the relevant art will appreciate that aspects of the routine can be practiced with other communications, data processing, or computing system configurations. In block 302, the routine begins by displaying options to purchase one or more cryptocurrencies via the user interface 104 of the kiosk 100. In block 304, the routine receives from a user a selection of a cryptocurrency via the user interface 104 of the kiosk 100. In response to receiving the user selection, in block 305, the routine may optionally request that the user input a user telephone number via the user interface 104 of the kiosk 100 and then receive the user telephone number. Also in response to receiving the user selection (and/or in response to requesting and receiving the user telephone number), in block 306, the routine obtains the current exchange rate for the selected cryptocurrency from a cryptocurrency exchange 206. A cryptocurrency exchange 206 is an online platform (e.g., Coinbase) that allows customers to trade cryptocurrencies (e.g., bitcoin) for other assets, such as conventional fiat currencies or other cryptocurrencies. The kiosk 100 communicates with the crypto server 202 to obtain the exchange rate by invoking an API of the crypto server 202. The crypto server 202 in turn communicates with the cryptocurrency exchange 206 to obtain the exchange rate. In some embodiments, communications between the kiosk 100 and the crypto server 202 and between the crypto server 202 and the cryptocurrency exchange 206 can be sent using Hyper Text Transfer Protocol Secure (HTTPS). In block 308, the routine displays the exchange rate to the user (e.g., via the user interface 104 of the kiosk 100). In block 310, the routine also displays transaction terms to the user via the user interface 104 of the kiosk 100. For example, the transaction terms may include policies regarding eligibility, privacy, fees, ownership, acknowledgement of risk, cancellations, etc.

In block 312, the routine receives payment (e.g., cash) from the user (e.g., via the bill acceptor 106 of the kiosk 100). When the payment is received, the kiosk 100 displays the amount of the selected cryptocurrency corresponding to the value of the received payment. Once the user confirms the purchase, in block 314, the routine purchases the cryptocurrency from the cryptocurrency exchange 206 in an amount based on the value of the received payment and the exchange rate by invoking an API of the crypto server 202. In some embodiments, two tokens (a redemption code and a PIN) are generated and associated with the transaction at the time of purchase, which can be used to redeem the cryptocurrency. The cryptocurrency exchange 206 uses the redemption code to verify the transaction and invokes an API of the crypto server 202 to verify the PIN with the crypto server 202. As described above with respect to FIG. 2, in embodiments in which the cryptocurrency exchange 206 is operated by a first entity and the crypto server 202 is operated by a second entity, the redemption code enables the first entity to verify the transaction and the PIN enables the second entity to independently verify the transaction. In block 316, the routine provides to the user, via the dispensing slot 114 of the kiosk 100, a receipt that includes the redemption code and PIN. In block 318, the routine can optionally provide instructions directing the user how to redeem the purchased cryptocurrency at the cryptocurrency exchange 206 (e.g., instructions for accessing a website associated with the cryptocurrency exchange 206). The instructions may be included on the receipt provided in block 316, displayed on the user interface 104 of the kiosk 100, or otherwise provided to the user. Then the routine completes.

Figure 4:
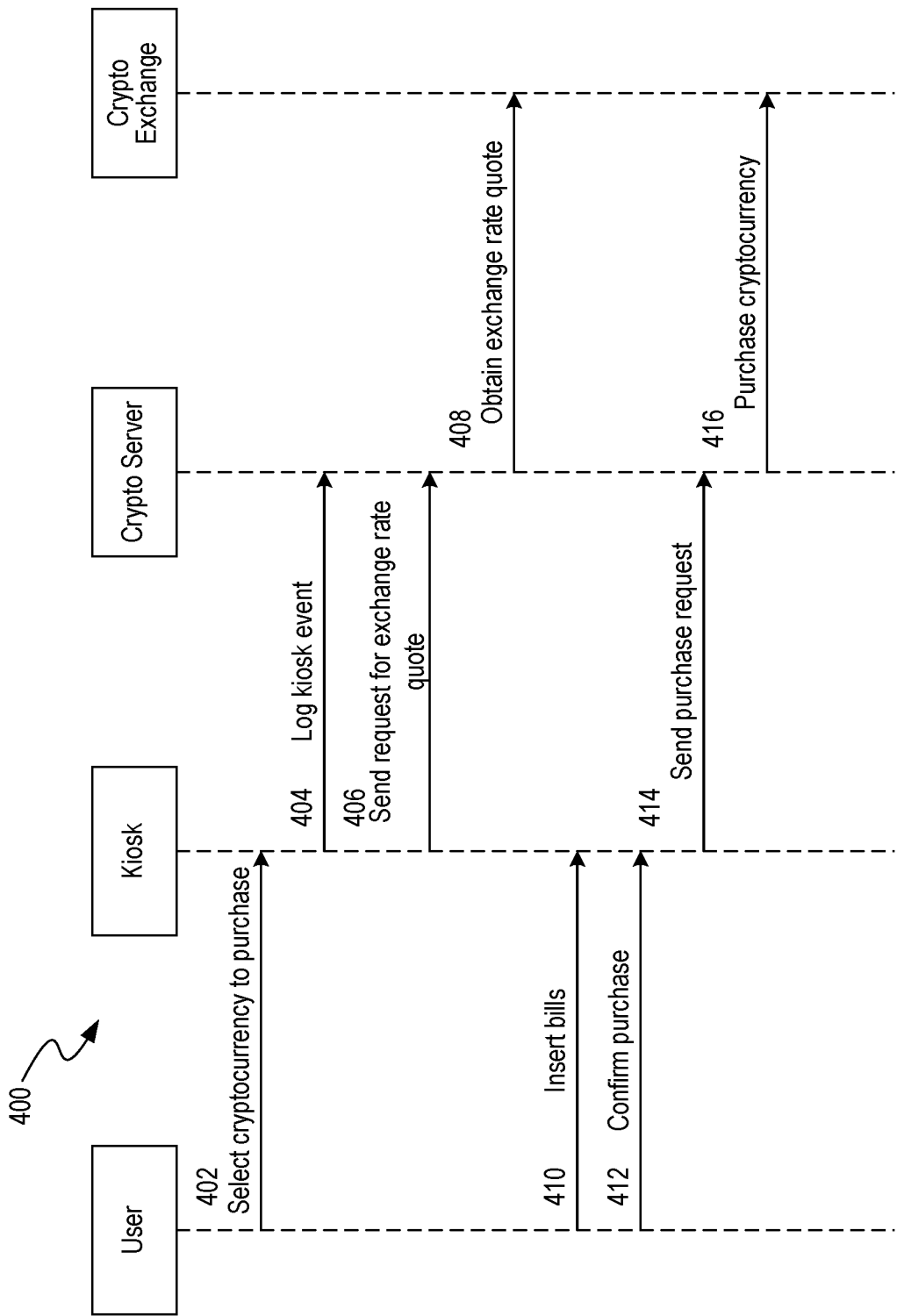
FIG. 4 is a sequence diagram illustrating a process of selling a cryptocurrency via a consumer-operated kiosk in accordance with some embodiments of the present technology.

FIG. 4 is a sequence diagram illustrating a process of selling a cryptocurrency via a consumer-operated kiosk in accordance with some embodiments of the present technology. The user selects 402 a cryptocurrency to purchase via the user interface 104 of the kiosk 100. In response to receiving the user selection, the kiosk 100 logs 404 a kiosk event to the crypto server 202 to indicate the start of a crypto transaction. The kiosk 100 then sends 406 a request to the crypto server 202 to get a real-time exchange rate quote from the cryptocurrency exchange 206. In response to receiving the request, the crypto server 202 communicates with the cryptocurrency exchange 206 to obtain 408 an exchange rate quote. The user then inserts 410 bills via the bill acceptor 106 of the kiosk 100. When the user confirms 412 the purchase, the kiosk 100 sends 414 a purchase request to the crypto server 202. In response to receiving the purchase request, the crypto server 202 purchases 416 the cryptocurrency from the cryptocurrency exchange 206.

Figure 5:
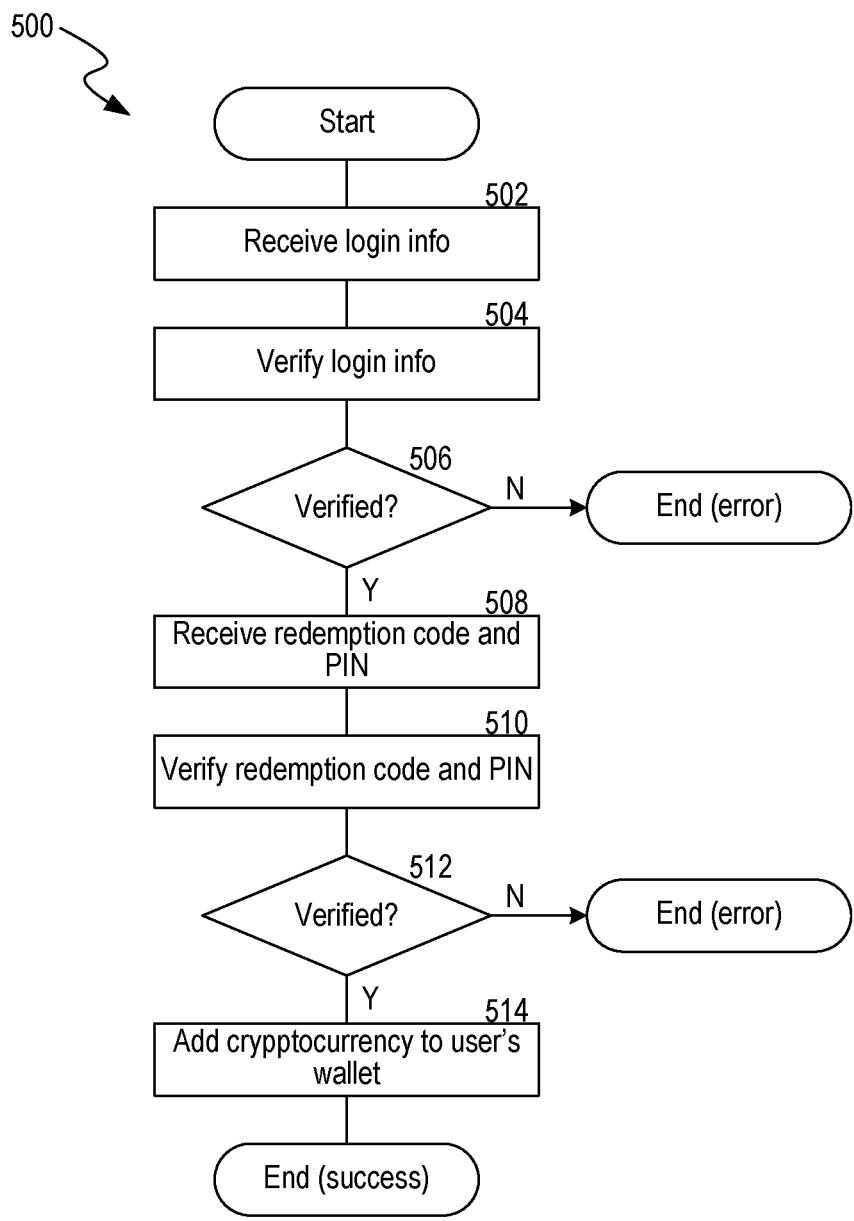
FIG. 5 is a flow diagram of a routine for redeeming a cryptocurrency in accordance with some embodiments of the present technology.

FIG. 5 is a flow diagram of a routine 500 for redeeming a cryptocurrency in accordance with some embodiments of the present technology. In some embodiments, the routine can be executed by a computing system of one of the cryptocurrency exchanges 206 in accordance with computer-readable instructions stored on the memory. In block 502, the routine begins when the routine receives login information (e.g., an ID and a password) from the user. The routine can receive the login information when the user goes to a website of the cryptocurrency exchange 206 and enters the login information using a personal electronic device (e.g., a personal computer, smartphone, etc.). The user can create an account or log in to an existing account. In block 504, the routine verifies the login information received from the user. In decision block 506, if the verification is successful, the routine proceeds to block 508, otherwise the routine completes with an error. In some embodiments, the user may be prompted to input a user telephone number in addition to, or in lieu of, the login information. For example, in embodiments in which the kiosk 100 required the user to input the user telephone number before the user purchased the cryptocurrency at the kiosk 100, the cryptocurrency exchange 206 may also require the user input the user telephone number at the cryptocurrency exchange 206 to proceed with redeeming the user's transaction. In such embodiments, the user telephone number may be associated with the transaction (e.g., associated with the redemption code and/or PIN) and provide an additional layer of security.

In block 508, the routine receives a redemption code and PIN from the user. These are the two tokens that were issued to the user when the user purchased the cryptocurrency. In block 510, the cryptocurrency exchange 206 uses the redemption code to verify the transaction associated with the redemption code. In addition to the verification purpose, the cryptocurrency exchange 206 uses the redemption code to track when the cryptocurrency is accessed and added into a cryptocurrency wallet. The cryptocurrency exchange 206 also communicates with the crypto server 202 to verify the PIN by invoking an API of the crypto server 202. In decision block 512, if the verification of the redemption code and PIN is successful, the routine proceeds to block 514, otherwise the routine completes with an error. In block 514, the routine adds the cryptocurrency to a cryptocurrency wallet of the user and then completes.

Figure 6:
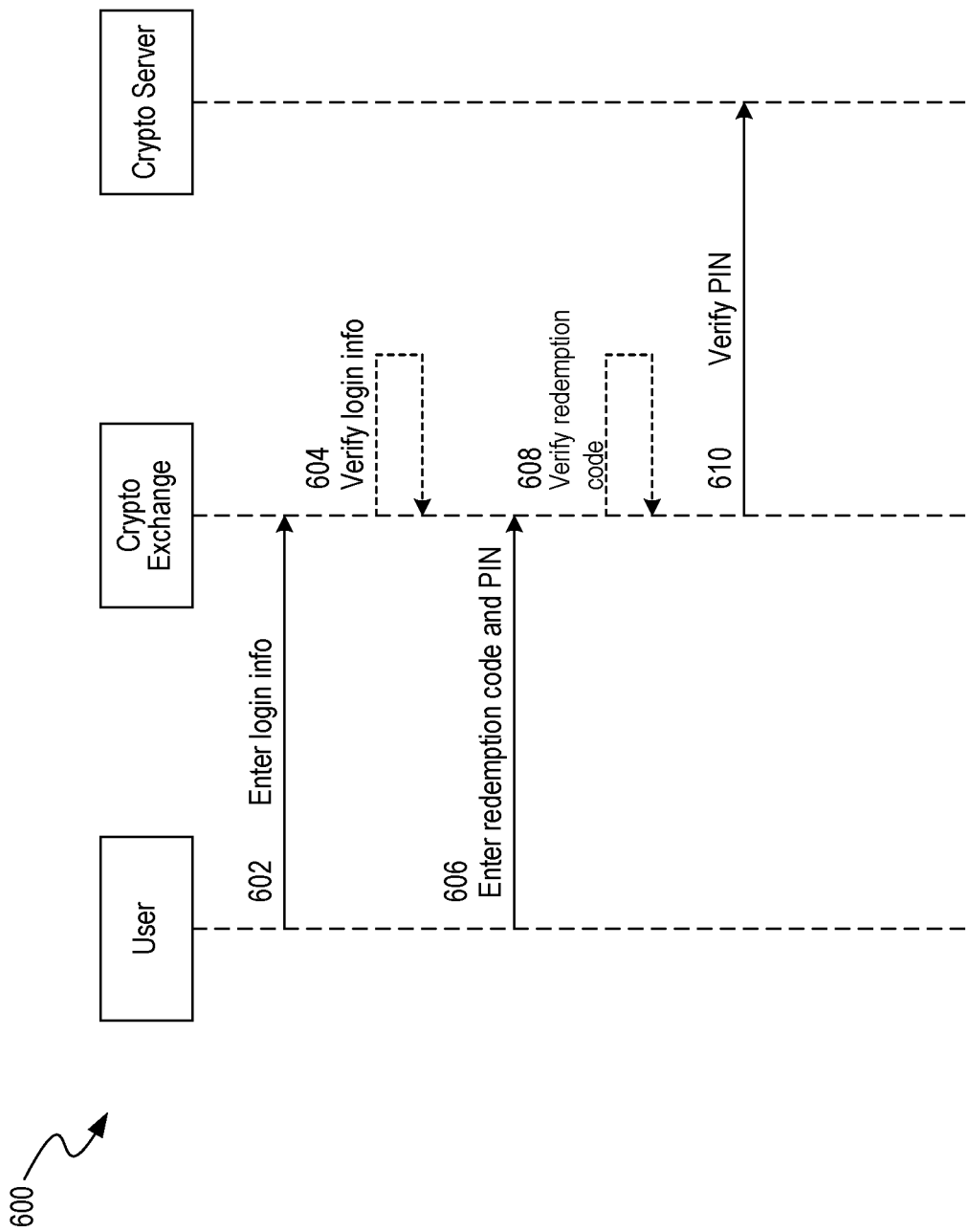
FIG. 6 is a sequence diagram illustrating a process for verifying a redemption code and PIN for a cryptocurrency purchase transaction in accordance with some embodiments of the present technology.

FIG. 6 is a sequence diagram illustrating a process for verifying a redemption code and PIN for a cryptocurrency purchase transaction in accordance with some embodiments of the present technology. The user goes to the cryptocurrency exchange website and enters 602 the user's login information to access the user's account. In response to receiving the login information, the cryptocurrency exchange 206 verifies 604 the login information. Then the user enters 606 the redemption code and PIN. In response to receiving the redemption code and PIN, the cryptocurrency exchange 206 verifies 608 the code and its associated transaction. In addition, the cryptocurrency exchange 206 verifies 610 the PIN with the crypto server 202 by invoking an API of the crypto server 202.

From the foregoing, it will be appreciated that specific embodiments of the disclosure have been described herein for purposes of illustration, but that various modifications may be made without deviating from the spirit and scope of the invention. Aspects of the invention described in the context of particular embodiments may be combined or eliminated in other embodiments. Further, while advantages associated with certain embodiments of the invention have been described in the context of those embodiments, other embodiments may also exhibit such advantages, and no embodiment need necessarily exhibit such advantages to fall within the scope of the invention. Accordingly, the invention is not limited, except as by the appended claims.

I claim:

1. A system for selling cryptocurrency, comprising:
   a consumer-operated kiosk having:
      a user interface,
      a funds input region configured to receive paper bills and/or coins,
      a first processor, and
      one or more first non-transitory computer-readable storage mediums storing first computer-executable instructions executable by the first processor;
   a first remote computer associated with an operator of the consumer-operated kiosk, the first remote computer having a second processor and one or more second non-transitory computer-readable storage mediums storing second computer-executable instructions executable by the second processor; and
   a second remote computer associated with a cryptocurrency exchange, the second remote computer having a third processor having one or more third non-transitory computer-readable storage mediums storing third computer-executable instructions executable by a third processor,
   wherein execution of the first computer-executable instructions by the first processor cause the first processor to control the consumer-operated kiosk to:

display to a user, via the user interface, one or more options to purchase one or more cryptocurrencies;
receive from the user, via the user interface, a selection of one of the one or more cryptocurrencies;
receive payment in the form of paper bills and/or coins from the user for the selected cryptocurrency via the funds input region;
send a request to the first remote computer to purchase the selected cryptocurrency from the cryptocurrency exchange in an amount based at least in part on a value of the received payment;
associate the purchase of the selected cryptocurrency with a first unique code and a second unique code, and
transmit to the user, and/or display to the user via the user interface, the first unique code and the second unique code;
wherein execution of the third computer-executable instructions by the third processor causes the third processor to control the second remote computer to:
receive, from a computing device of the user, the first unique code and the second unique code,
verify the first unique code to verify the user and/or the purchase of the selected cryptocurrency for the cryptocurrency exchange, and
send the second unique code to the first remote computer;
wherein execution of the second computer-executable instructions by the second processor causes the second processor to control the first remote computer to:
verify the second unique code to verify the user and/or the purchase of the selected cryptocurrency for the operator of the consumer-operated kiosk; and
wherein, in response to the third processor verifying the first unique code and the second processor verifying the second unique code, further execution of the third computer-executable instructions by the third processor causes the third processor to control the second remote computer to transfer the selected cryptocurrency to a cryptocurrency wallet of the user.

2. The system of claim 1 wherein execution of the first computer-executable instructions by the first processor further causes the first processor to control the consumer-operated kiosk to:
send, in response to receiving the user selection and before receiving payment from the user, a request to the first remote computer to obtain a cryptocurrency exchange rate, wherein the request directs the first remote computer to contact the cryptocurrency exchange to obtain the cryptocurrency exchange rate;
in response to sending the request, receive the cryptocurrency exchange rate via the first remote computer; and
present the cryptocurrency exchange rate to the user,
wherein the amount of the purchased cryptocurrency is further based at least in part on the cryptocurrency exchange rate.

3. The system of claim 1 wherein execution of the first computer-executable instructions by the first processor further causes the first processor to control the consumer-operated kiosk to provide the user with directions for obtaining the purchased cryptocurrency from the cryptocurrency exchange.

4. The system of claim 3 wherein the directions direct the user to access a cryptocurrency exchange website associated with the cryptocurrency exchange and input both the first unique code and the second unique code via the website to obtain the purchased cryptocurrency.

5. The system of claim 1 wherein the first unique code is stored at the second remote computer and the second unique code is stored at the first remote computer.

6. The system of claim 5 wherein execution of the second computer-executable instructions by the second processor further causes the second processor to control the first remote computer to verify, using the second unique code, the receipt of payment from the user for the selected cryptocurrency via the funds input region of the kiosk.

7. The system of claim 1 wherein execution of the first computer-executable instructions by the first processor further causes the first processor to control the consumer-operated kiosk to:
request, via the user interface, a user telephone number;
receive, from the user, the user telephone number; and
associate the first unique code and the second unique code with the user telephone number,
wherein the first unique code, the second unique code, and the user telephone number are all necessary for the user to obtain the purchased cryptocurrency from the cryptocurrency exchange.

8. The system of claim 1 wherein the first unique code and the second unique code are computer-generated.

9. The system of claim 1 wherein the first unique code is computer-generated, and wherein the second unique code is input to the consumer-operated kiosk by the user via the user interface.

10. The system of claim 1 wherein the first unique code is a redemption code and the second unique code is a personal identification number (PIN).

11. The system of claim 1 wherein the funds input region is a bill acceptor, and wherein the payment is paper bills.

12. A method for selling cryptocurrency via a system, the system including (i) a consumer-operated kiosk having a user interface, a funds input region, and a first processor, (ii) a first remote computer associated with an operator of the consumer-operated kiosk and having a second processor, and (iii) a second remote computer associated with a cryptocurrency exchange and having a third processor, the method comprising:
displaying to a user, by the first processor and via the user interface, one or more options to purchase one or more cryptocurrencies;
receiving from the user, via the user interface, a selection of one of the cryptocurrencies;
receiving payment in the form of paper bills and/or coins from the user for the selected cryptocurrency via the funds input region;
sending a request, by the first processor, to the first remote computer to purchase the selected cryptocurrency from the cryptocurrency exchange in an amount based at least in part on a value of the received payment;
associating, at least partially by the first processor, the purchase of the selected cryptocurrency with a first unique code and a second unique code;
transmitting to the user, by the first processor, and/or displaying to the user, by the first processor and via the user interface, the first unique code and the second unique code;
receiving, by the third processor and from a computing device of the user, the first unique code and the second unique code;
verifying, by the third processor, the first unique code, wherein verifying the first unique code verifies the user and/or the purchase of the selected cryptocurrency for the cryptocurrency exchange;

sending, by the third processor, the second unique code to the first remote computer;

verifying, by the second processor, the second unique code, wherein verifying the second unique code verifies the user and/or the purchase of the selected cryptocurrency for the operator of the consumer-operated kiosk; and after verifying the first unique code by the third processor and verifying the second unique code by the second processor, transferring, at least partially by the third processor, the purchased cryptocurrency to a cryptocurrency wallet of the user.

13. The method of claim 12 wherein the method further comprises:

sending, by the first processor and in response to receiving the user selection and before receiving payment from the user, a request to the first remote computer to obtain a cryptocurrency exchange rate, wherein the request directs the first remote computer to contact the cryptocurrency exchange to obtain the cryptocurrency exchange rate;

in response to sending the request, receiving, by the first processor, the cryptocurrency exchange rate via the first remote computer; and presenting, by the first processor, the cryptocurrency exchange rate to the user, wherein the amount of the purchased cryptocurrency is further based at least in part on the cryptocurrency exchange rate.

14. The method of claim 12, further comprising providing, by the first processor, the user with instructions for obtaining the purchased cryptocurrency from the cryptocurrency exchange.

15. The method of claim 14 wherein the instructions direct the user to access a cryptocurrency exchange website associated with the cryptocurrency exchange and input both the first unique code and the second unique code via the website to obtain the purchased cryptocurrency.

16. The method of claim 12 wherein the first unique code is stored at the second remote computer and the second unique code is stored at the first remote computer.

17. The method of claim 16, further comprising verifying, by the second processor and using the second unique code, the receipt of payment from the user for the selected cryptocurrency.

18. The method of claim 12, further comprising:

requesting, by the first processor and via the user interface, a user telephone number;

receiving, by the first processor and from the user, the user telephone number; and associating, at least partially by the first processor, the first unique code and the second unique code with the user telephone number, wherein the first unique code, the second unique code, and the user telephone number are all necessary for the user to obtain the purchased cryptocurrency from the cryptocurrency exchange.

19. The method of claim 12 wherein the first unique code and the second unique code are computer-generated.

20. The method of claim 12 wherein the first unique code is computer-generated, and wherein the second unique code is input to the computer-operated kiosk by the user via the user interface.

21. The method of claim 12 wherein the first unique code is a redemption code and the second unique code is a personal identification number (PIN).

22. The method of claim 12 wherein the funds input region is a bill acceptor, and wherein receiving the payment from the user via the funds input region comprises receiving paper bills from the user via the bill acceptor.

* * * * *